United States Patent [19]

Conanan

[11] Patent Number: 4,854,047

[45] Date of Patent: Aug. 8, 1989

[54] INCLINOMETER OF LIQUID IN THIN GRADUATED CYLINDER

[76] Inventor: Virgilio D. Conanan, 475 Graphic Blvd., New Milford, N.J. 07646

[21] Appl. No.: 207,243

[22] Filed: Jun. 16, 1988

[51] Int. Cl.[4] .................................................. G01C 9/36
[52] U.S. Cl. ........................................ 33/377; 33/451
[58] Field of Search ................. 33/377, 378, 365, 367, 33/390, 451, 371

[56] References Cited

U.S. PATENT DOCUMENTS

| | | | |
|---|---|---|---|
| 1,267,049 | 5/1918 | Boos | 33/377 X |
| 1,422,231 | 7/1922 | Stanley | 33/390 |
| 2,584,917 | 2/1952 | Powell | 33/377 |
| 4,745,687 | 5/1988 | Wilhelmy | 33/377 X |

FOREIGN PATENT DOCUMENTS 533213 12/1921 France .................... 33/377

Primary Examiner—Harry N. Haroian

[57] ABSTRACT

An inclinometer is characterized wherein a thin, transparent plastic cylindrical container filled precisely one-half its volume by a inert liquid, is located in the middle of a homogeneous base in the shape of a quarter-circle whose two straight edges are exactly perpendicular, and when positioned upright, the surface of the liquid forms a longitudinal line intersecting the center of the cylinder and the first degree scale marked on the bottom of the cylinder; such that by viewing the said first scale opposite the liquid level, one can rapidly and directly measure the angle displaced by an object over a full 360-degree movement; or, for the purpose of finding any deviation from the horizontal plane, in any and all of the North, South, East and West directions, and/or any direction in-between each direction, can be measured by laying the inclinometer flat on the surface of the object whose inclination is to be measured, and the angular displacement is read directly from the second scale imprinted on the external wall of the cylinder.

7 Claims, 2 Drawing Sheets

INCLINOMETER OF LIQUID IN THIN GRADUATED CYLINDER

FIELD OF THE INVENTION

This invention relates to the rapid measurement of an object's position relative to the zenith and/or in all directions along the horizontal plane, and the rapid measurement of differential angular movement as an object rotates about its original position.

DESCRIPTION OF PRIOR ART

Various structures and objects require rapid and constant monitoring of position with respect to either the vertical (zenith) or horizontal. Examples of such structures and objects are those used in the construction of roads, bridges, buildings and homes. Other mobile, movable and portable structures include ships, satellite earth station antennas, telescopes, light and heavy guns or other objects that require frequent pointing or angular repositioning.

A more common angle-measuring device consists of a suspended weight (plumb line) that uses the direction of gravitational force as the reference angle. The disadvantages of such simple device are: The weight tend to oscillate like a pendulum; they are susceptible to wind effects; and the angular scales are difficult to read and interpret due to parallax. To overcome the above disadvantages, some prior art devices incorporate damping mechanisms to reduce the weight's oscillation; others enclose the weight in transparent containers to prevent further movement due to wind, and still others incorporate magnifiers to increase the scale resolution. But encasement of the weight and other related improvements create new problems due to friction and generally make the devices more complex and expensive. Other inclinometers utilize the property of liquids to seek its own level due to gravitational force. This technique dates back to the ancient times and was used for building irrigation canals. The Incas of Mexico were known to have measured angles by placing strings in parallel with the mouth of an open bowl filled with water. The same principle is applied in modern times; when one fills a plastic tube with liquid, the water level on both ends of the tube always settles at the same vertical level. A common variation of the above technique is the bubble inclinometer, where an arc-shaped transparent tube is partially filled with liquid; horizontal reference is established when the bubble is exactly at the center of the arc. Another variation is a dome-shaped clear container that is partially filled with liquid and placed on the surface to be measured. Exact horizontal balance is achieved when the bubble is at the center of the dome. The main disadvantage of such devices is that they not indicate the exact numerical angular displacement in degrees.

Another type of inclinometer uses one or more heavy, usually metallic balls placed either on a bowl-shaped container or an arc-shaped track. It relies on the force of gravity to allow the ball to settle to the lowest location on the container. The angle is measured through scales marked on the container holding the ball(s). The main disadvantage of this technique is its inaccuracy due to hysteresis, which is the tendency of the ball(s) to resist movement from a stationary point when tilted in small increments. This disadvantage is due to the friction between the ball's surface and that of the track, and the lack of momentum required to move the ball. The surfaces of the ball and track can made smooth to minimize friction, but this causes additional manufacturing processes and consequently make the final product more expensive. In addition, as the device is transported and jarred, the impact creates imprints on the ball's surface and on the surface of the track holding the ball which can cause the ball to get lodged on any of the imprints and lead to further inaccuracies.

Still another type of inclinometer is by electronic means, where transducers are used to measure angular displacements and produce a proportional output voltage. The signals are electronically processed for subsequent display either in analog or digital form. Such transducers are generally called encoders and it can resolve angles in tenths or hundreths of degrees with varying degrees of sensitivity. Due to the precision required in manufacturing the encoders and the complexity of the electronics used for the power supply and display mechanisms, such devices are expensive and currently cost from $2,000.00 to $10,000.00.

What is needed, therefore, is an inexpensive device that is sufficiently accurate, portable, easy to manufacture, and eliminates the drawbacks introduced by prior art. Moreover, it is desirable to make an inexpensive inclinometer that is easily attachable to the surface under test to allow rapid measurement of the angle displaced by an object or structure.

SUMMARY OF THE INVENTION

An inclinometer is characterized wherein a thin cylindrical container made of transparent plastic is filled precisely one-half its volume by a fluid that is inert with respect to the container. The cylinder is located in the middle of a plastic base made of the same material as the said cylinder and the said base is shaped in the form of a quarter-circle. The two straight edges of the base are exactly perpendicular. Printed on the surface of the base, at the curved portion is a 90-degree scale to serve as a protractor. Printed on the surface of the base, at the straight edges, are graduations for measuring in the Metric and English units of length.

The cylinder is made of transparent plastic material. The top end of the cylinder is left open and its edge is grooved to allow the proper seating of a separate lid during assembly, and also serves to increase the surface area of adhesion between the lid and the cylinder.

The outer surface of the bottom end of the cylinder contains an angular scale of zero to 360 degrees, with the origin of the said scale falling precisely at the center of the cylinder, and the said scale shows at least one-degree increments. The preferred embodiment shows complementary angles to permit reading angles both in the clockwise or counterclockwise direction such as 0/360 degrees, 90/270 degrees, 180/180 degrees, and 270/90 degrees.

The outer wall of the cylinder contains a circumferential angular scale where zero falls precisely at midpoint between the top and bottom of the said cylinder. Above the zero mark are lines indicating +1, +2, and +3 degrees and their finer graduations in between. Below the zero mark are lines for −1, −2, and −3 degrees and their finer graduations in between. Also imprinted on the outer wall of the said cylinder are the letters N, E, S and W denoting North, East, South and West. The said letters are located directly above the 0/360 degrees, 90/270 degrees, 180/180 degrees and 270/90 degrees marked on the bottom of the said cylinder respectively.

An inert fluid with respect to the plastic base material, preferably ethylene glycol, water or Fluorinert, whose volume is precisely one-half that of the cylinder's volume, is injected into the cylinder. The lid is then glued in place and checked for hermetic sealing.

The operation of the inclinometer is quite simple. When positioned upright, such that one edge of the base is perfectly plumb, the liquid in the cylinder settles on the bottom half of the said cylinder due to gravity, and the surface of the liquid forms a longitudinal line intersecting the center of the cylinder, the 0/360 degree mark and the 180/180 degree mark. As the inclinometer is attached to an object whose angle is to be measured, and tilted about its original position, the liquid level tends to maintain its natural horizontal level due to the constancy of gravity and since the line formed by the liquid surface always rotates about the center of the cylinder, any movement of the object results in a corresponding new set of complementary angles intersected by the liquid surface. Therefore, by viewing the scale opposite the liquid level, one can rapidly and directly measure the angle displaced by an object over a full 360-degree movement.

The simultaneous measurement of inclination in the North, South, East and West directions is accomplished rapidly by laying the inclinometer flat on the surface of the object whose inclination is to be measured, which causes the liquid to settle to the bottom half of the cylinder. The displacement is read directly from the scale imprinted on the cylinder wall, opposite to the point where the liquid settles. For example, if a surface is perfectly level, then the liquid settles at exactly halfway from the bottom to the top of the wall of the said cylinder. Any deviation from the horizontal plane, in any and all of the North, South, East and West directions, and/or any direction in-between can be read directly to within one tenth of a degree from horizontal.

The fluid in the preferred embodiment of the invention is dyed in light green because this color is more pleasant to the eye when viewed for prolonged periods, and provides sufficient contrast for viewing the moving liquid opposite the scale.

The invention presents the following advantages: There is no friction to deal with since there are no mechanical parts; it can be fabricated at very little cost because there are only three parts—the base, the lid and the fluid—and plastic materials are more conducive to mass production; hysteresis is virtually eliminated due to the liquid's low surface tension; it is impact resistant; it is safe and requires no power.

DESCRIPTION OF PREFERRED EMBODIMENTS

Figure 1:
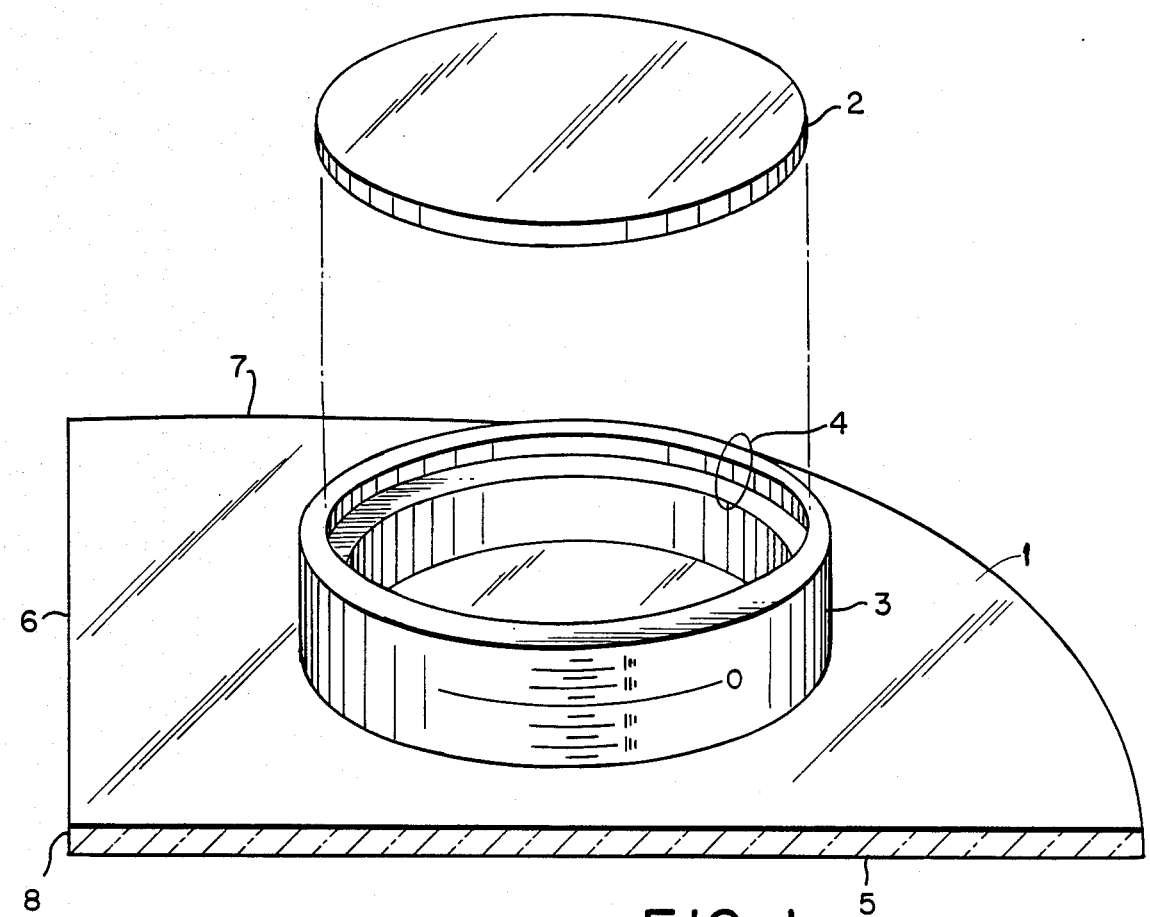
FIG. 1 is an isometric view of an inclinometer arrangement prior to the placement of the fluid.
Figure 2:
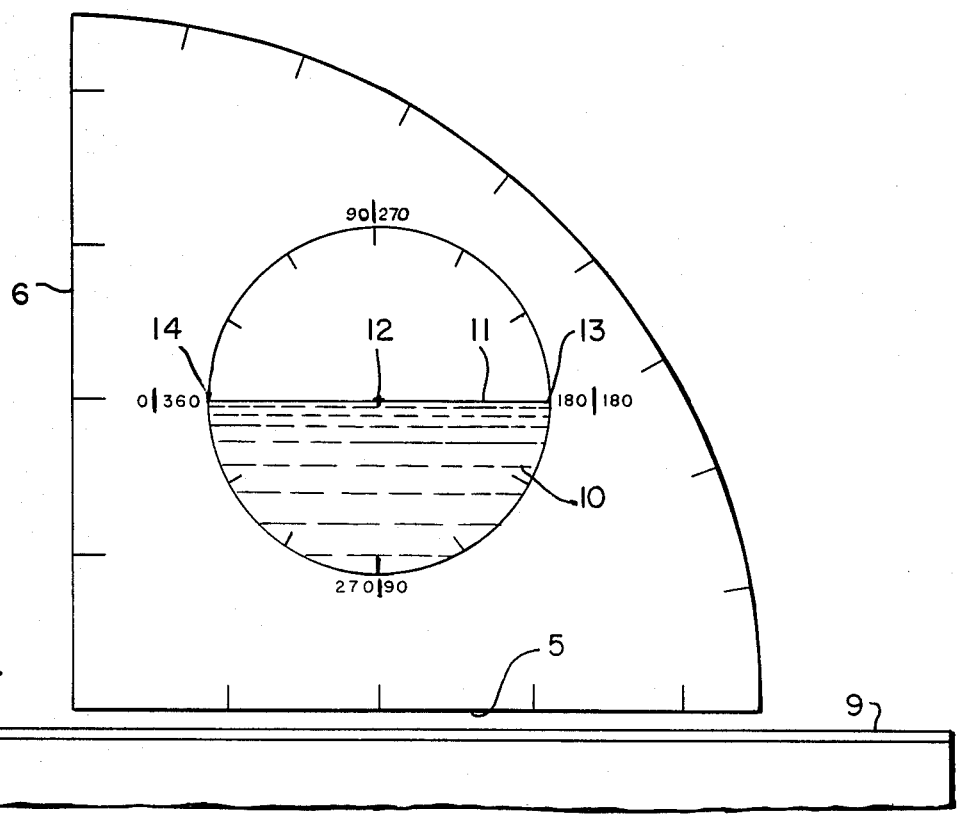
FIG. 2 is a side view of an inclinometer arrangement standing upright, with the liquid already contained in the cylinder, as normally seen by the user when measuring angles referenced from either the vertical or the horizontal.
Figure 3A:
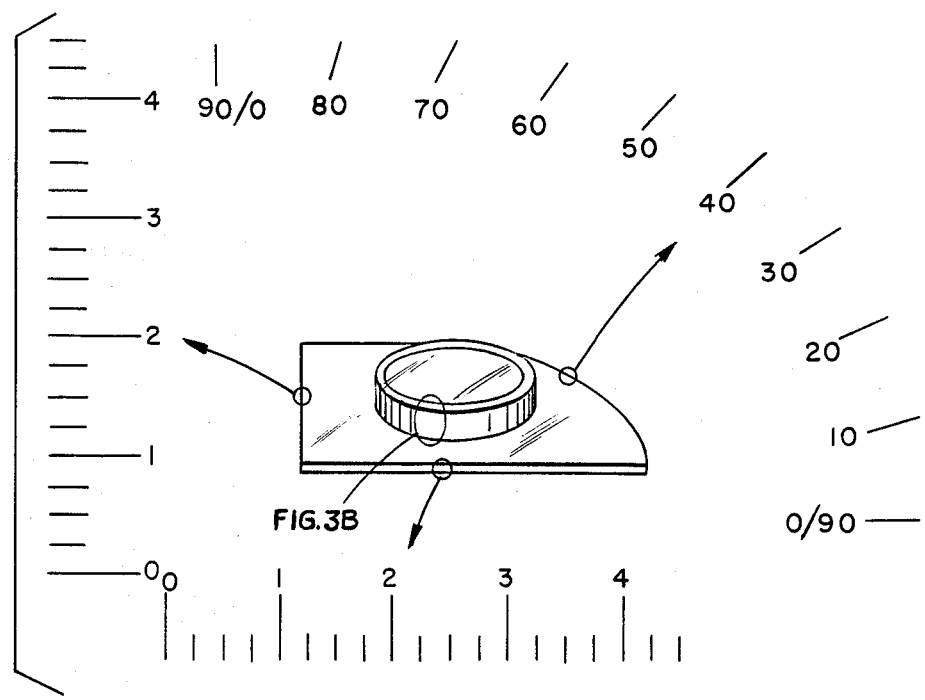
FIGS. 3A & 3B are details of the scales
Figure 3B:
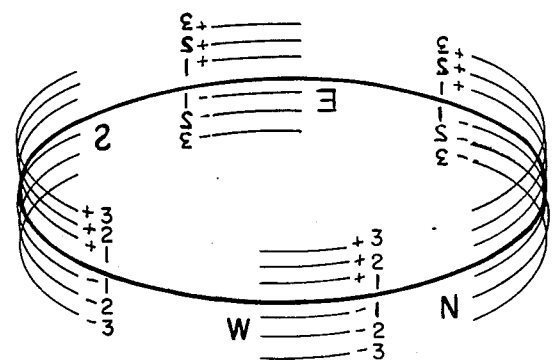
Figure 4:
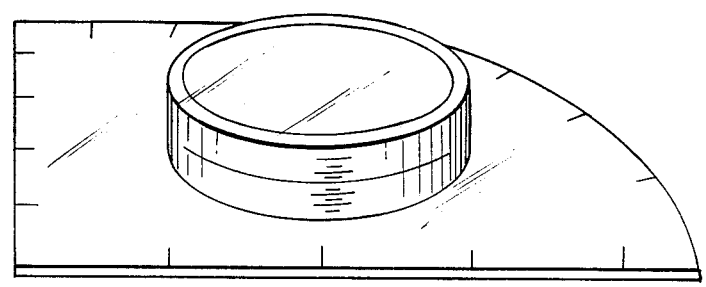
FIG. 4 is an isometric view of the invention laying on its side, as normally seen by the user when measuring surface inclination simultaneously in all North, South, East and West directions.

The inclinometer basically consists of two components: the plastic base 1, and the fluid 10. FIG. 2.

The base 1 is made of homogenous transparent plastic material whose geometry follows that of a thin, hollow cylinder 3 placed at the center of a quarter-circle The top of the cylinder is grooved 4 preferably so that the groove depth is equivalent to the thickness of the lid.

The lid 2 is a thin, solid cylinder made of the same transparent material as the base 1, it is clear and does not contain any markings. The lid diameter is equivalent to the outer diameter of the cylinder, minus one half the cylinder's wall thickness.

The preferred inner diameter of the said cylinder is 7.62 cm (3.00 inches ) and the preferred inner height is 1.27 cm (0.5 inches ).

The outside surface surrounding the cylinder wall is marked circumferentially to precisely indicate the angles in the North, South, East and West directions. The said graduations preferably show: Zero degrees, +1.0 degree, +2.0 degrees, +3.0 degrees, 1.0 degree, −2.0 degrees, and 3.0 degrees. Each degree is further subdivided into 0.1 degree graduations.

At the bottom end of the cylinder, opposite that of the lid, is marked in one-degree graduations, a scale indicating zero to 360 degrees, with the lines pointing towards the center of the cylinder, both in the clockwise and counter-clockwise direction so that the 9:00 o'clock position is marked 0/360 degrees, the 12:00 o'clock as 90/270 degrees, the 3:00 o'clock as 180/180 and the 6:00 o'clock as 270/90 degrees. The preferred location of the said scale marking is on the exterior of the bottom of the said cylinder.

The base of the preferred embodiment contains two straight edges 5,6 oriented exactly perpendicular to each other. The curved edge 7 of the said base shows angles of zero to 90 degrees, as referenced from the origin 8 or the intersection of the two straight edges 5,6 so that the first graduation is marked 0/90 degrees , midpoint is 45/45 degrees and the opposite end is marked 90/0 degrees.

The inclinometer can be made of plastic polymer such as acrylic, polyuretane or polyethylene. The polymer may be treated with other materials that make the plastic stronger and less susceptible to breakage. The plastic is chosen to provide the least temperature coefficient of expansion in order to maintain its accuracy over a wide range of operating temperatures.

The preferred thickness of both the base and the cylinder lid is 0.0794 cm (0.0625 inches,) and fabricated by injection molding.

The scales are also marked in the mold. The fluid in the preferred embodiment is dyed light green. The assembly process consists of the following steps: First, the base is laid on its side as in FIG. I on a perfectly level surface. Second, the liquid, whose volume is precisely one half that of the hollow cylinder is injected into the cylinder. Third, the lid 2 is glued in place.

I claim:

1. An inclinometer comprising: a thin transparent hollow cylinder of a first volume having a closed bottom end and an open top end; said top end; said top end having an internal circumferential groove for accepting a thin cover member in a fluid tight manner, said hollow cylinder having an inert fluid therein whose volume is precisely one half the said first volume, said bottom of said hollow cylinder is substantially centrally mounted on a flat transparent base member having the configuration of a quarter circle with two edges being perpendicular to each other and graduated in English and metric units and the arcuate edge being graduated from 0 to 90 degrees, said hollow cylinder having a 0 to 360 degree scale imprinted on the external surface of the bottom end thereof and a 0 to plus and minus 3 degrees scale imprinted on the external surface of the wall of said cylinder with the zero of said last mentioned scale coinciding with level of said fluid in said cylinder, so that when said inclinometer is applied in horizontal or vertical orientation to any object various angles and lengths can be determined.

2. The inclinometer of claim 1 wherein the cylinder height and diameter ratio is at least 6:1 and the thickness of the wall of said cylinder is a least ⅛ of the height.

3. The inclinometer of claim 1 wherein the inert liquid is dyed light green.

4. The inclinometer of claim 1 wherein the liquid is either ethylene glycol; water or fluorinert.

5. The inclinometer of claim 1 wherein the graduations are visible an both sides of the cylinder.

6. The inclinometer of claim 1 wherein the graduations are imprinted with chemicals whose pigmentation is black or any pigmentation that provides a sharp constrast with light green.

7. The inclinometer of claim 1, wherein said 0 to +/−3 degree scale indicate the angle from a perfect horizontal plane.

* * * * *